United States Patent
Le Roux (10) Patent No.: US 12,102,944 B2
(45) Date of Patent: Oct. 1, 2024

(54) METHOD OF REDUCING THE CONCENTRATION OF HYDROGEN SULFIDE IN A GAS STREAM

(71) Applicant: BioAir Solutions LLC, Voorhees, NJ (US)

(72) Inventor: Louis D. Le Roux, Voorhees, NJ (US)

(73) Assignee: BioAir Solutions LLC, Voorhees, NJ (US)

( * ) Notice: Subject to any disclaimer, the term of this patent is extended or adjusted under 35 U.S.C. 154(b) by 0 days.

(21) Appl. No.: 17/967,052

(22) Filed: Oct. 17, 2022

(65) Prior Publication Data
US 2024/0066439 A1 Feb. 29, 2024

Related U.S. Application Data

(63) Continuation of application No. 12/581,686, filed on Oct. 19, 2009, now abandoned.

(60) Provisional application No. 61/106,467, filed on Oct. 17, 2008.

(51) Int. Cl.
| | |
|---|---|
| *B01D 29/01* | (2006.01) |
| *B01D 29/11* | (2006.01) |
| *B01D 35/02* | (2006.01) |
| *B01D 39/16* | (2006.01) |

(52) U.S. Cl.
CPC .......... *B01D 29/016* (2013.01); *B01D 29/117* (2013.01); *B01D 35/02* (2013.01); *B01D 39/1676* (2013.01); *B01D 2239/0421* (2013.01); *B01D 2239/0428* (2013.01); *B01D 2239/069* (2013.01); *B01D 2239/0695* (2013.01)

(58) Field of Classification Search
None
See application file for complete search history.

(56) References Cited

U.S. PATENT DOCUMENTS

| | | | |
|---|---|---|---|
| 2,883,058 | A | 4/1959 | Rene |
| 3,112,261 | A | 11/1963 | Porter et al. |
| 3,347,381 | A | 10/1967 | Minch et al. |
| 3,365,864 | A | 1/1968 | Yoshitomo |

(Continued)

FOREIGN PATENT DOCUMENTS

| | | |
|---|---|---|
| CA | 2740898 C | 4/2017 |
| CN | 106621533 A | 5/2017 |

(Continued)

OTHER PUBLICATIONS

Performance of High-Rate Biotrickling Filter Under Ultra-High H2S Loadings at a Municipal WWTP; by Louis D. le Roux and Matthew E. Johnson; published by BioAir Solutions; 11 Pages; 2010. (Year: 2010).

(Continued)

*Primary Examiner* — Robert J Popovics
(74) *Attorney, Agent, or Firm* — Flaster Greenberg P.C.

(57) ABSTRACT

A filtration medium for the purification of a liquid or a gas material includes a mat having a first surface and a second surface in which at least one of the first surface or the second surface is substantially non-planar. The mat comprises a foamed resin 5 having a density of about 1 lbs/ft3 to about 3 lbs to ft3 and/or an indentation load deflection of about 35 lbs to about 150 lbs. Methods of filtering a gas or liquid material using the filtration medium are also provided, as are methods of fabrication of the modules.

12 Claims, 8 Drawing Sheets

(56) References Cited

U.S. PATENT DOCUMENTS

| | | | |
|---|---|---|---|
| 3,506,600 A | 4/1970 | Zocco et al. | |
| 3,552,553 A | 1/1971 | Reading | |
| 3,720,319 A | 3/1973 | White | |
| 3,842,804 A | 10/1974 | Christensen et al. | |
| 3,847,811 A | 11/1974 | Stengelin et al. | |
| 3,925,248 A | 12/1975 | Moroni et al. | |
| 3,947,362 A | 3/1976 | Etani | |
| 3,957,017 A | 5/1976 | Carmignani et al. | |
| 4,039,448 A | 8/1977 | Etani | |
| 4,165,281 A | 8/1979 | Kuriyama et al. | |
| 4,178,161 A | 12/1979 | Galica et al. | |
| 4,192,742 A | 3/1980 | Bebin et al. | |
| 4,334,944 A | 6/1982 | Creyf et al. | |
| 4,421,534 A | 12/1983 | Walker | |
| 4,427,548 A | 1/1984 | Quick | |
| 4,469,599 A | 9/1984 | Gros et al. | |
| 4,503,150 A | 3/1985 | Triolo | |
| 4,555,342 A | 11/1985 | Grant | |
| 4,576,718 A | 3/1986 | Reischl et al. | |
| 4,620,917 A | 11/1986 | Nozawa et al. | |
| 4,662,900 A | 5/1987 | Ottengraf | |
| 4,696,747 A | 9/1987 | Verstraete et al. | |
| 4,758,460 A | 7/1988 | Spicer et al. | |
| 4,760,027 A | 7/1988 | Sublette | |
| 4,810,385 A | 3/1989 | Hater et al. | |
| 4,826,882 A | 5/1989 | Bredbenner et al. | |
| 4,861,465 A | 8/1989 | Augustyniak | |
| 4,869,824 A | 9/1989 | Melin et al. | |
| 4,877,527 A | 10/1989 | Brownell | |
| 4,908,128 A | 3/1990 | Chiba | |
| 4,911,843 A | 3/1990 | Hunniford et al. | |
| 4,931,183 A | 6/1990 | Klein et al. | |
| 4,988,436 A | 1/1991 | Cole | |
| 5,031,261 A | 7/1991 | Fenner | |
| 5,084,164 A | 1/1992 | Del | |
| 5,096,591 A | 3/1992 | Benn | |
| 5,116,506 A | 5/1992 | Williamson et al. | |
| 5,139,543 A | 8/1992 | Sowinski | |
| 5,232,676 A | 8/1993 | Wolff et al. | |
| 5,270,207 A | 12/1993 | Matsumura et al. | |
| 5,273,818 A | 12/1993 | Kim et al. | |
| 5,348,654 A | 9/1994 | Fischer | |
| 5,445,660 A | 8/1995 | Koers | |
| 5,563,069 A | 10/1996 | Yang | |
| 5,578,114 A | 11/1996 | Oude | |
| 5,718,823 A | 2/1998 | Tomita et al. | |
| 5,762,784 A | 6/1998 | Jowett | |
| 5,858,768 A | 1/1999 | Bonnin et al. | |
| 6,087,159 A | 7/2000 | Finn | |
| 6,100,081 A | 8/2000 | Buelna | |
| 6,168,711 B1 | 1/2001 | Teramachi et al. | |
| 6,194,198 B1 | 2/2001 | Koers | |
| 6,221,652 B1 | 4/2001 | Janssen et al. | |
| 6,271,020 B1 | 8/2001 | Coleman | |
| 6,283,309 B1 | 9/2001 | Koers | |
| 6,531,078 B2 | 3/2003 | Laine et al. | |
| 6,602,407 B2 | 8/2003 | Talbot et al. | |
| 6,696,284 B2 | 2/2004 | Haridas et al. | |
| 7,276,366 B2 | 10/2007 | Parker et al. | |
| 7,530,127 B2 | 5/2009 | Leifermann et al. | |
| 7,536,739 B2 | 5/2009 | Poulos | |
| 7,621,010 B1 | 11/2009 | Eltzroth | |
| 7,674,306 B2 | 3/2010 | Bugli et al. | |
| 8,318,476 B2 | 11/2012 | Parker et al. | |
| 8,673,140 B2 | 3/2014 | Jowett et al. | |
| 8,765,451 B2* | 7/2014 | Schreuder | C10K 1/003 |
| | | | 423/243.11 |
| 9,890,343 B2 | 2/2018 | Ettl et al. | |
| 10,434,467 B2* | 10/2019 | Shen | B01J 20/28059 |
| 10,493,402 B2* | 12/2019 | Koers | C12M 47/18 |
| 10,543,458 B2* | 1/2020 | Klok | C02F 3/2806 |
| 10,661,220 B2* | 5/2020 | Jackson | B01D 53/8693 |
| 10,695,716 B2* | 6/2020 | Harshman | B01D 53/84 |
| 10,974,190 B2* | 4/2021 | Jackson | C01B 17/64 |
| 11,613,710 B2* | 3/2023 | Roe | C10G 19/02 |
| | | | 210/759 |
| 2001/0034056 A1 | 10/2001 | Corey | |
| 2002/0023871 A1 | 2/2002 | Talbot et al. | |
| 2006/0042209 A1 | 3/2006 | Dallas et al. | |
| 2006/0134771 A1 | 6/2006 | Deshusses | |
| 2006/0151655 A1 | 7/2006 | Johnston | |
| 2006/0216492 A1 | 9/2006 | Thomson | |
| 2007/0096523 A1 | 5/2007 | Greene | |
| 2007/0180802 A1 | 8/2007 | Parker et al. | |
| 2007/0259416 A1 | 11/2007 | Parker et al. | |
| 2008/0184684 A1 | 8/2008 | Bugli et al. | |
| 2008/0274020 A1 | 11/2008 | Matsuoka | |
| 2010/0089818 A1 | 4/2010 | Koers | |
| 2010/0107872 A1* | 5/2010 | Bethell | C12M 47/18 |
| | | | 95/92 |
| 2010/0261266 A1* | 10/2010 | Nagamori | C12M 47/18 |
| | | | 435/300.1 |
| 2012/0264197 A1* | 10/2012 | Mitariten | C12M 47/18 |
| | | | 435/283.1 |
| 2014/0335001 A1* | 11/2014 | Niedringhaus | C01D 7/126 |
| | | | 423/220 |
| 2016/0200996 A1 | 7/2016 | Ettl et al. | |
| 2018/0311614 A1 | 11/2018 | Koers | |
| 2018/0333676 A1* | 11/2018 | Jameson | B01D 53/82 |
| 2019/0039001 A1 | 2/2019 | Le Roux | |
| 2019/0039020 A1* | 2/2019 | Mahajan | B01D 53/8612 |
| 2019/0262769 A1* | 8/2019 | Jackson | E21B 21/068 |
| 2020/0246744 A1* | 8/2020 | Jackson | E21B 43/34 |
| 2021/0113959 A1* | 4/2021 | Little | C02F 1/5245 |
| 2021/0253444 A1* | 8/2021 | Little | C02F 1/74 |
| 2022/0241724 A1* | 8/2022 | Tee | B01D 53/52 |
| 2024/0066439 A1* | 2/2024 | Le Roux | B01D 29/016 |

FOREIGN PATENT DOCUMENTS

| | | |
|---|---|---|
| DE | 4004030 A1 | 8/1991 |
| EP | 0190801 A1 | 8/1986 |
| EP | 0669155 A1 | 8/1995 |
| EP | 0903476 A1 | 3/1999 |
| FR | 2051381 A5 | 4/1971 |
| GB | 1281874 A | 7/1972 |
| GB | 2178447 A | 2/1987 |
| GB | 2180554 A | 4/1987 |
| JP | H0389913 A | 4/1991 |
| JP | H05312017 A | 11/1993 |
| JP | H0947613 A | 2/1997 |
| JP | H10272325 A | 10/1998 |
| JP | 6148819 B2 | 5/2017 |
| JP | 6259787 B2 | 12/2017 |
| WO | 2006009427 A1 | 1/2006 |
| WO | 2010045644 A1 | 4/2010 |

OTHER PUBLICATIONS

PCT International Search Report and Written Opinion dated Feb. 3, 2010 in Application No. PCT/US09/61182 (11 pages).
Japanese Response to Office Action of Jun. 3, 2016 in Divisional Application No. 2015-83330 (5 oaqes) (English claims).
"Anaerobic Digester Improvement Project", Oct. 2010, 31 pages.
"Applicant Response to Examination Report No. 1 (May 19, 2022) in counterpart Australian Application No. 2020204464", May 19, 2022.
"Biofiltration Primer, CEP www.aiche.org/cep/", Apr. 2001, 9 pages.
"Biological Odor Control System", 31 pages.
"Biotrickling Filter Systems", 19 pages.
"Biotrickling Scrubber, Technical Specifications", 16 pages.
"Chinese Response to Reexamination Notification of Sep. 13, 2015", Sep. 13, 2015, 14 pages.
"Examination Report No. 1 (May 24, 2021) in counterpart Australian Application No. 2020204464", May 24, 2021.
"Japanese Notice of Final Rejection dated Dec. 11, 2014", Dec. 11, 2014, 5 pages.
"Japanese Response to Pre Appeal Exam Report dated Oct. 6, 2015", Oct. 6, 2015, 10 pages.

(56) References Cited

OTHER PUBLICATIONS

"Muddy Creek Wastewater Treatment Plant, Manufactured Odor Control System", 11 pages.
Indian Examination Report dated May 15, 2018 in Application No. 2817/DELNP/2011, May 15, 2018, 6 pages.
"Northeast V\ANTP Biofilter Odor Control System", 10 pages.
"Notice of Acceptance (Jun. 2, 2022) in counterpart Australian Application No. 2020204464", Jun. 2, 2022.
"Odor Control Equipment Shreveport", Aug. 2011, 16 pages.
"Odor Control System", Feb. 18, 2010, 30 pages.
"Polyurethane Foam Association Brochure", In Touch, May 1991, 3 pages.
"Response to Second Chinese Office Action", Jul. 23, 2014, 14 pages.
"Section 41 70 19—Biotower Units", Aug. 2011, 21 pages.
200980149626.6 , "Second Chinese Office Action dated Mar. 13, 2014 in Application No. 200980149626.6", Mar. 13, 2014, 30 pages.
AU2009305531 , "Australian Examination Report dated Jun. 26, 2015 in Application No. 2009305531", Examination Report, Jun. 26, 2015, 4 pages.
AU2016203952 , "Australian Exam Report dated Jul. 3, 2017 in Application No. 2016203952", Jul. 3, 2017, 3 pages.
CA2,740,898 , "Canadian Office Action dated Jan. 26, 2015 in Application No. 2,740,898", Office Action, Jan. 26, 2015, 3 pages.
CA2,740,898 , "Response to Canadian Office Action dated Jul. 24, 2015 in Application No. 2,740,898", Office Action, Jul. 24, 2015, 11 pages.
CA2,740,898 , "Response to Second Canadian Office Action dated Mar. 29, 2016 in Application No. 2,740,898", Second Canadian Office Action, Mar. 29, 2016, 8 pages.
CA2,740,898 , "Second Canadian Office Action dated Sep. 29, 2015 in Application No. 2,740,898", Office Action, Sep. 29, 2015, 3 pages.
CA2,740,898 , "Third Canadian Office Action dated Apr. 20, 2016", Office Action, Apr. 20, 2016, 3 pages.
CN 200980149626.6 , "Chinese Office Action dated May 24, 2013 in Application No. 200980149626.6", May 24, 2013, 28 pages.
CN200980149626.6 , "Chinese Decision of Reexamination dated May 19, 2016 in Application No. 200980149626.6", May 19, 2016, 25 pages.
CN200980149626.6 , "Chinese Decision on Rejection of Sep. 2, 2014 in Application No. 200980149626.6", Sep. 2, 2014, 26 pages.
CN200980149626.6 , "Chinese Notification of Reexamination of Jan. 4, 2016 in Application No. 200980149626.6", Jan. 4, 2016, 24 pages.
CN200980149626.6 , "Chinese Reexamination Notification of May 29, 2015 in Application No. 200980149626.6", May 29, 2015, 24 pages.
CN200980149626.6 , "Chinese Request for Reexamination dated Dec. 17, 2014 in Application No. 200980149626.6", Dec. 17, 2014, 6 pages.
CN200980149626.6 , "Chinese Response to Second Notification of Reexamination of Apr. 5, 2016 in Application No. 200980149626. 6", Apr. 5, 2016, 21 pages.
CN200980149626.6 , "Response to Chinese Office Action dated Dec. 9, 2013 in Application No. 200980149626.6", Dec. 9, 2013, 18 pages.
CN2018042601872070 , "Chinese Office Action dated May 2, 2018 in Divisional Application No. 2018042601872070", May 2, 2018, 33 pages.
EP09821392 , "European Search Report in Application No. EP09821392", Nov. 29, 2012, 3 pages.
EP09821392 , "Response to European Search Report dated Oct. 29, 2013 in Application No. EP09821392", Oct. 29, 2013, 11 pages.
EP09821392.9 , "European Communication with Examiner dated Apr. 24, 2018 in Application No. 09821392.9", Apr. 24, 2018, 5 pages.
Gabriel, David , et al., "Conversion of Full-Scale Wet Scrubbers to Biotrickling Filters for H2S Control at Publicly Owned Treatment Works", Journal of Environmental Engineering, Oct. 2004, 8 pages.
Gabriel, David , et al., "Performance of a Full-scale Biotrickling Filter Treating H2S at a Gas Contact Time of 1.6 to 2.2 Seconds", Environmental Progress, vol. 22, No. 2, Jul. 2003, 9 pages.
JP2011-532315 , "Japanese Office Action dated Oct. 24, 2013 in Application No. 2011-532315", Oct. 24, 2013, 8 pages.
JP2011-532315 , "Japanese Office Action of Sep. 16, 2016 in Application No. 2011-532315", Sep. 16, 2016, 3 pages.
JP2011-532315 , "Japanese Pre Appeal Exam Report dated Jul. 31, 2015 in Application No. 2011-532315", Jul. 31, 2015, 3 pages.
JP2011-532315 , "Japanese Response to Office Action of Mar. 16, 2017 in Application No. 2011-532315", Mar. 16, 2017, 205 pages.
JP2011-532315 , "Response to Japanese Office Action dated Apr. 24, 2014", Office Action, Apr. 24, 2014, 36 pages.
JP2011-532315 , "Second Japanese Office Action dated Dec. 15, 2014 in Application No. 2011-532315", Dec. 15, 2014, 8 pages.
JP2015-83330 , "Japanese Office Action dated Dec. 14, 2015 in Divisional Application No. 2015-83330", Dec. 14, 2015, 3 pages.
JP2015-83330 , "Japanese Office Action of Nov. 1, 2016 in Divisional Application No. 2015-83330", Nov. 1, 2016, 4 pages.
JP2015-83330 , "Japanese Response to Office Action filed May 1, 2017 in Divisional Application No. 2015-83330", May 1, 2017, 206 pages.

* cited by examiner

Unit 2: Odor and Hydrogen Sulfide Removal Performance Data

FIG. 8

| Location | Odor Conc. (OU) | Odor % Removal | $H_2S$ Conc. (ppmv) | $H_2S$ % Removal | Inlet $H_2S$ during Sample (ppmv) | Airflow (cfm) | Residence Time (s) | Mass Loading [g $H_2S/m^3$]/hr |
|---|---|---|---|---|---|---|---|---|
| *10 seconds Empty Bed Residence Time (Sample Round 1)* | | | | | | | | |
| Inlet | 16000 | | | | 19 | | | |
| Outlet | 1100 | 93.1 | 0 | 100 | 20 | 482 | 9.8 | 10.3 |
| *10 seconds Empty Bed Residence Time (Sample Round 2)* | | | | | | | | |
| Inlet | 78000 | | | | | | | |
| Outlet | 2400 | 96.9 | 0.0 - 0.1 | 100.0 - 99.9 | 142 – 147 | 475 | 9.9 | 73.5 |
| *7 seconds Empty Bed Residence Time (Sample Round 3)* | | | | | | | | |
| Inlet | 140000 | | | | | | | |
| Outlet | 4900 | 96.5 | 0 | 100 | 160 – 150 | 688 | 6.9 | 114.2 |
| *5 seconds Empty Bed Residence Time (Sample Round 4)* | | | | | | | | |
| Inlet | 83,000 | | | | | | | |
| Outlet | 8300 | 90 | 7.5 - 11.5 | 94.3 - 97.1 | 220 – 187 | 991 | 4.8 | 215.8 |

METHOD OF REDUCING THE CONCENTRATION OF HYDROGEN SULFIDE IN A GAS STREAM

CROSS-REFERENCE TO RELATED APPLICATIONS

This application is a continuation of and claims the benefit of priority to copending U.S. application Ser. No. 12/581,686, filed Oct. 19, 2009, which in turn claims priority under 35 U.S.C. § 119(e) to U.S. Provisional Patent Application No. 61/106,467, filed Oct. 17, 2008, the entire disclosure of which is incorporated herein by reference.

BACKGROUND OF THE INVENTION

Larger scale biological purification/filtration of gas and liquid materials requires correspondingly larger scale purification/filtration devices, including filtration media. The design and development of such devices are limited by several parameters, for example, the need for large specific surface area filter media (to increase efficiency), the tendency of filtration media to collapse or fold under the combined load of biomass and liquid, and the commercial pressure to minimize the footprint of the device. Filter media composed of a corrugated bacterial bed rolled into a "jelly roll" configuration with spaced apart channels for water flow have been suggested for use in the purification of sewer water. Other prior art devices use external structures to provide structural strength to the media material within the reactor vessels, for example "wagon wheel" configured metal scaffolding around which filter media is disposed or web-like support elements that encased the filter media. However, the external structures alone cannot prevent collapse of the media and such configurations may be prone to clogging by excess biomass. Moreover, the scaffold-like support structures occupy space in the reactor that could be filled by 'live' media, thereby eroding the efficiency of the system.

Thus, there remains need in the art for filtration media, modules and devices that optimize performance of the filtration activity, including optimizing mass transfer (and therefore optimization of filtration/biological oxidation efficiency), provide for retention of more microorganisms per unit of volume of media, and that enhance the "life expectancy" of the filtration media itself, allowing for longer use before replacement or maintenance (necessitated, for example, by collapse of mat material or clogging of mat with biomass that has overproliferated) as compared to conventional filtration equipment.

BRIEF SUMMARY OF THE INVENTION

The invention includes a filtration medium for the purification of a liquid or a gas material that includes a mat having a first surface and a second surface. At least one of the first surface or the second surface is substantially non-planar. The mat comprises a foamed resin having a density of about 1 lbs/ft$^3$ to about 3 lbs/ft$^3$ and/or an indentation load deflection of about 35 lbs to about 150 lbs.

Also included in the invention is a filtration medium for the purification of a liquid or a gas material comprising at least two mats, each mat having a first surface and a second surface, wherein at least one of the first surface or the second surface is substantially non-planar and has a substantially non-uniform convolution profile.

Included are devices for the filtration of a liquid and/or a gas that comprise one or more reactor modules. The reactor modules include the filtration medium and a substantially cylindrical chamber and/or a substantially rectangular chamber that may include sides, a top and a bottom. The chamber additionally includes a base that extends from the sides of the chamber towards the interior of the chamber and the filtration medium is disposed within the chamber.

Methods of filtering a gas or liquid material using the filtration medium are also provided, as are methods of fabrication of the modules.

BRIEF DESCRIPTION OF THE DRAWINGS

The foregoing summary as well as the following detailed description of embodiments of the invention may be better understood when read in conjunction with the appended drawings. It should be understood, however, that the invention is not limited to the precise arrangements and instrumentalities shown. In the drawings:

FIG. 7 (including FIGS. 7A and 7B) are graphs showing H$_2$S removal performance of a device of the invention at a 7 second residence time.

DETAILED DESCRIPTION OF THE INVENTION

The invention provides a filtration medium that can be used to filter various liquid or gas materials. The filtration medium may be inoculated with a biomass (most often primarily bacterial or fungal (yeast) in nature; often a specific strain or mixture of strains) that oxidizes or breaks down compounds in the gas or liquid as it passes across the medium. The filtration media, modules, and devices of the invention were developed to emphasize performance of the filtration activity, including enhancement of mass transfer (and therefore enhancement of filtration/oxidation efficiency) and improvement of the adherence of microorganisms to the media (providing increased number of microorganisms per unit volume of media) as well as enhance the "life expectancy" of the filtration medium itself, allowing for longer use before replacement or maintenance of the filtration medium (necessitated, for example, by collapse of mat material or clogging of mat with biomass that has overproliferated) as compared to conventional biological filtration mediums and/or modules.

The invention includes a filtration medium for the purification or filtration of a liquid or a gas material, such as wastewater, or reduction and elimination of odorous compounds in water, gas or other emissions. The filtration medium includes a mat that has a first surface and second surface and may be of any size or format. In general, it may be desirable that the mat has a substantially rectangular prism format; however, depending on the end use and the specifics of the module or device into which it is to be fitted, the size, shape, and format may be varied. In an embodiment, the mat has thickness (i.e., length of Z axis of the mat) of about ¼ inches to about 4 inches, alternatively, about ¾ inches to about 3 inches, or about 1 inch to about 2 inches in thickness. In most applications the mat may be 1 inch thick or greater.

As explained above, the length and width of the mat may vary, but in most circumstances it may be preferable that the length dimension of the mat is greater than the width dimension. For example, the length dimension of the mat may be about 2 to about 35 times greater than the width dimension or about 400 to about 750 times greater than the width dimension. In some embodiments, the mat may be any shape, including plan view polygon (irregular or regular), circle, rectangle (including square), oval, ellipse, or triangle. The format of the mat will vary depending on the format of the reactor chamber that is selected.

The mat or mats used may be unitary or may be formed of two or more sections of mat pieces together to form the desired geometry. The sections may be attached to one another in any manner, such as, for example, by glue, staples, they may be sewed together or joined by heat fusion or heat seaming.

In an embodiment, the mat has a first surface and a second surface, at least one of which is non-planar, wholly or in part. By non-planar, it is meant that the surface, when viewed from the side (i.e., as a profile) is not flat, but rather is convoluted and exhibits surfaces terminating in at least two different planes in space (the "peak" and the "valley" points), thereby expanding the surface area of the mat available for bacterial (biomass) adherence. The structures that provide the non-planar characteristics are described by their "convolution profiles" as discussed below.

In some embodiments, the mat may have each side with a non-planar surface. The mat may be multilayered; for example it may have 2 to 95 layers. As an example, the mat may consist of three or more layers, wherein one or both of the outer layer(s) had a non-planar surface (i.e., bears a convolution profile as noted above).

At least one of the mat's surfaces has a non-continuous convolution profile, that is, when viewed in cross section the surface is substantially non-planar and such characteristic is provided to the surface by convolutions that are arranged so that, when sequential cross sections of the mat are viewed, the "peak" and "valley" of the first cross section are located along the mat in a different place than the "peak" and "valley" of the subsequent cross section. This non-uniform placement of the convolutions provides turbulence to the material being passed through the filter. This differs from a foam mat having uniform corrugations, that is a profile such that when sequential cross sections of such a mat are viewed, they are substantially identical in relative placement of the "peak" and the "valley" of the convolutions.

The surface convolutions may take the form of random convolutions, ordered or patterned convolutions or any combination of these. For example, with reference to FIG. 5, the convolution profile of the surface(s) may be an egg crate profile, a sine wave profile (such as for example, a short dine wave profile), a rectangular profile, a zig-zag rectangular profile, a chevron profile, a projecting villi (fingerlike projections) profile, a compound villi, a tractor wheel profile, or a V-shaped profile. In an embodiment, each of the first and the second surfaces of the mat are non-planar, and may have the same or different convolution profiles. In some embodiments, it may be preferred that the selected profile has a peak-to-valley dimension of about 0.1 inch to about 2 inches or about 0.5 inches to about 1.5 inches.

The surface convolutions may be placed or spaced on the surface(s) of the mat in any manner to create the profiles discussed above. For example, as shown in FIG. 5, zig-zag or wave-like patterns may be placed longitudinally in an evenly spaced manner on the mat surface. Alternatively, the placement of the convolution (as viewed in plan view) may be random or ordered. See, FIG. 5 for non-limiting examples. In an embodiment, it may be preferred that the convoluted surfaces are arranged so that the non-uniform channels that are created are oriented to face the path of the flow stream of the gas or liquid, although other arrangements may be used.

The mat may comprise a foamed resin. The resin may be any known or developed in the art that permits at least a minimal level of bacterial adhesion. Thermoplastic resins may be preferred. In some embodiments, the resin may be, for example, a phenolic resin, a urethane resin, a polyurethane resin, a polyolefin, a nylon, a polystyrene, polypropylene, polyethylene, polyether, polyester and/or copolymer and derivatives of such polymers. The foamed resin may be a reticulated or open cell foamed resin.

In some embodiments, it may be preferred that the foamed resin is a polyurethane, an ester polyurethane, or an ether polyurethane. Such foamed resins may be prepared by any means known in the art. As an example, if the selected foamed resin is an ether polyurethane foam, it may be made by, for example, by first forming a cellular polyurethane foam that has a network of a least some strands and at least some cell windows by mixing together foam-forming compounds.

As is known to a person of skill in the art, the recipes for polyurethane foam are expressed in terms of parts by weight per 100 parts of polyol. Thus, for example, for each 100 parts by weight of a polyether polyol, the foam formulation according to the invention includes: about 20.0 to about 60.0 parts by weight of an isocyanate; about 1.5 to about 5.0 parts of a blowing agent, such as water; about 0.20 to about 4.0 parts of a blow catalyst; about 0.0 to about 1.0 parts of a gel catalyst, and about 1.0 to about 3.0 parts of stabilizing surfactant, such as a silicone surfactant. Other additives such as dyes, pigments, colorants, crosslinking additives may also be incorporated into the foam formulation. After the foam forming components have been mixed together, the foam is permitted to rise and cure, preferably under atmospheric temperature and pressure. The resulting foam has pore sizes preferably in the range of about 8 to about 50 pores per linear inch. The foam is further reticulated to remove any cell windows. This process renders the foam with minimum resistance to fluid flow. Reticulation is carried out by melting the windows by, for example, a high temperature flame front to heat the cell windows or walls to above the melting point of the polymer. Thus, by carefully regulating the conditions under which this process is carried out, the cell windows can be melted without adversely affecting or melting the skeletal strands. The resulting foam will permit air flows through the foam in a range of about 10 to about 50 cubic feet per minute when measured through a 2 inch by 2 inch by 1 inch foam sample.

Regardless of the type of foamed resin selected, the selected material or materials may be substantially hydrophobic or substantially hydrophilic, depending on the specific end application of the mat and the desired level of bacterial adherence necessary or desired. The material may be selected for its inherent capacity to promote the growth of certain desirable bacterial strains and/or retard the growth of other, less desirable microorganisms, depending on the end application for the media. In some embodiments, it is desirable that the materials selected are suitable for maintaining a bacterial population so that, in practice, at least 90%, at least 80%, at least 70%, or at least 60% of the volume of filter medium is capable of supporting biomass, thereby improving the number of microorganisms per unit volume and, consequently, the efficiency per unit volume of the system.

In some embodiments where the filtered material is a gas, it may be preferred that the material selected has a porosity of at least about 99%, at least about 95%, at least about 90%, or at least about 85%, to facilitate permeation of the gas phase to the bacterial population.

Additionally, the mat may be coated with a material that enhances bacterial attachment (and/or selectively promotes or retards growth of specific microorganism) and/or such additives may be mixed into the foamed resin material prior to cure. For example, the foamed resin may contain an anti-mycotic or a differentially selective antibacterial compound. The foamed resin may be coated with any substance to alter or enhance desirable properties. Suitable coatings may include acrylic polymer and/or acrylic copolymers and latex emulsions.

Figure 4A:
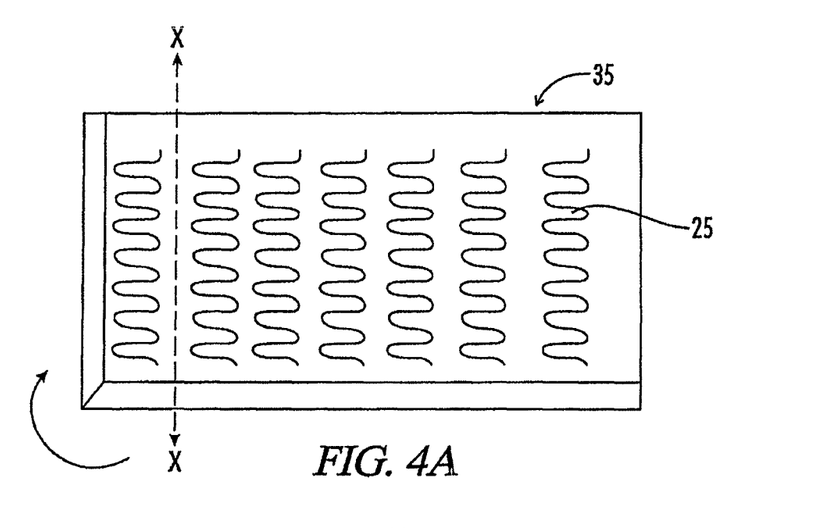
FIGS. 4A and 4B are schematic drawings illustrating the winding or rolling of the mat around a hypothetical axis X-X.
Figure 4B:
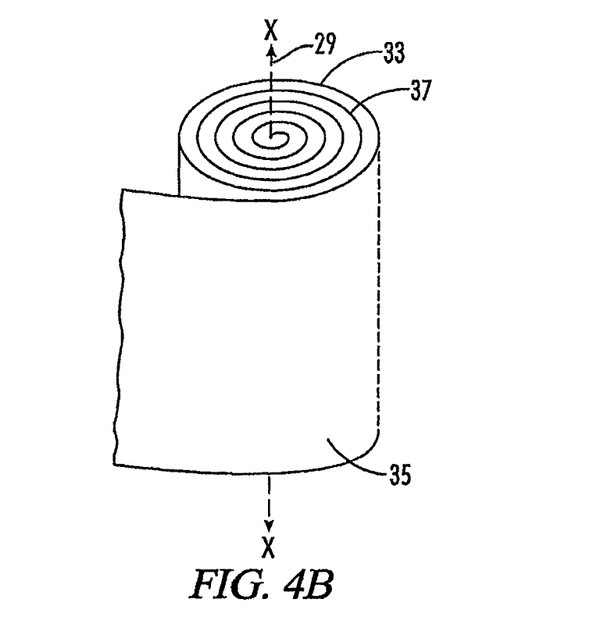
Figure 5A:
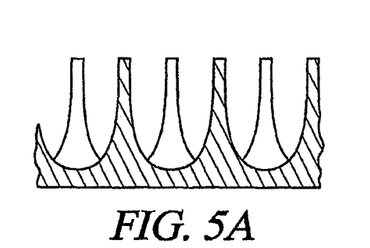
FIGS. 5A, 5B, 5C, 5D, 5E, 5F, and 5G each show schematic drawings of exemplary convolution profiles for the non-planar surfaces of the mat as well as plan view examples of the placement of the convulsions on the mat.
Figure 5B:
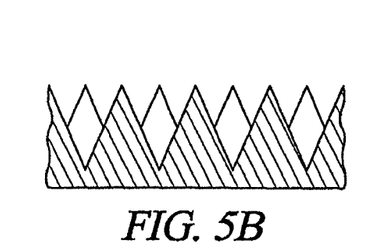
Figure 5C:
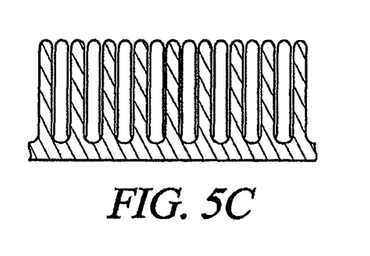
Figure 5D:
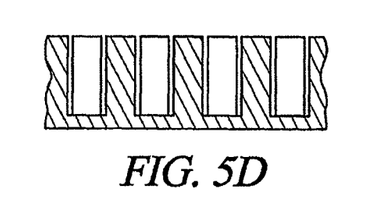
Figure 5E:
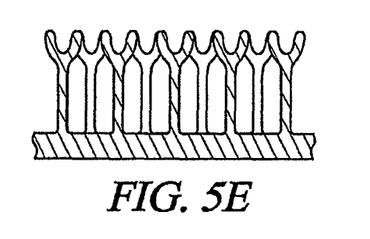
Figure 5F:
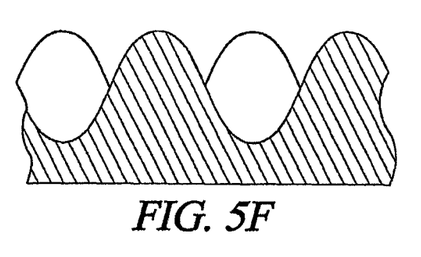
Figure 5G:
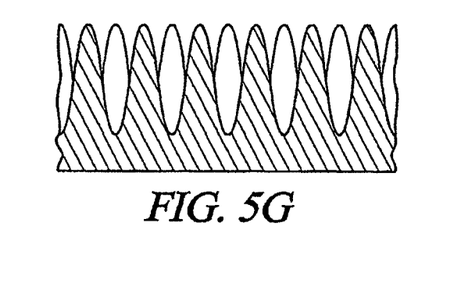

In an embodiment, the mat of the filtration medium is configured into a cylindrical format (33). With reference to FIGS. 4A and 4B, this may be accomplished by rolling or winding the mat (35) around a hypothetical winding axis X-X (29) so that the first surface (25) contacts the second surface at a contact point (37). Such contact between the surfaces may be continuous or discontinuous contact. In an embodiment that may be preferred, at least the first surface (25) is non-planar and bears projecting convolutions (31), and the mat (35) is wound around the hypothetical axis X-X (29) such that the projecting convolutions (31) of the first surface (25) are present at the exterior (or the interior, if desired) of the concentric layers created by winding.

The winding tension applied will vary depending on the material used, the type of convolutions, the end application and other factors. However, in an embodiment, it may be desirable to have a winding tension of about 1 to about 40 lbs per foam width (ft) or about 2 to about 20 lbs per foam width (ft). In an embodiment, the winding tension may be about 4 lbs/ft. The modification of winding tension allows for adjustment in turbulence created by the medium and to which the filtered material is subjected as it passes though the medium.

In an embodiment, the mat is rolled with sufficient winding tension such that contact of at least a portion of first surface (25) to the second surface (26) is made. If too much space is permitted between the layers of the rolled cylindrical format (33), the liquid or gas material may pass through the medium at too high a rate to enable mass transfer at optimum efficiency. In an embodiment where the filtration medium is used to remove certain odorous compounds from air, it may be desirable to ensure that the first surface and the second surface of the mat are substantially in continuous contact when the mat is rolled in cylindrical format. Preferably, the mat is wound in a manner that avoids formation of substantially any straight line or direct channels through the filter medium.

In an alternative configuration, the mat used may be of a polygon geometry (such as a rectangular) format. Two or more mats of substantially similar dimensions may be arranged together in a vertical stack, as shown for example in FIG. 6. In this arrangement, each surface of each mat is in physical contact with the surface of the adjacent mat. The degree of contact of the mat surfaces may be modulated by addition or lessening of a horizontal compressive force applied to the mats, that is a compressive force applied in the direction of an axis that is substantially horizontal to the vertical axis of the stack. This force may be applied, for example, by wiring or binding the vertical stack together prior to insertion in a chamber, or may be applied by the sidewalls, once the individual loose mats are assembled within the chamber to form a reactor. By modulating the degree of contact between the mat surfaces, the amount and/or flow rate of gas or liquid through the medium can be optimized in each reactor regardless of any other factors, such as mat thickness, size and shapes of convolutions, size of reactor, etc.

The selected foamed resin used for the mat may have one or more mechanical characteristics that provide structural support for the mat during the filtration process once it is loaded with biomass and fluid weight. In an embodiment, the foamed resin has at least one mechanical characteristic chosen from a density of about 1 lbs/ft$^3$ to about 3 lbs/ft$^3$, alternatively, about 1.2 lbs/ft$^3$ to about 2.5 lbs/ft$^3$, or about 1.8 lbs/ft$^3$.

Additionally or alternatively, it may be preferable that the foamed resin from which the mat is made of a moderate to high firmness. Firmness may be quantified by several methods/protocols in the art, including determination of a given material's indentation load deflection. Indentation load deflection (ILD) is the force required to deflect the foam 25% (by volume) in pounds (lbs). ILD is a well-known method of analysis and may be carried out, for example, as directed in ASTM D3574-95.

In an embodiment of the invention, one of the mechanical characteristics of the foamed resin is an indentation load deflection of about 35 lbs to about 150 lbs, about 75 lbs to about 120 lbs, or about 85 lbs to about 105 lbs. It may be suitable for the foamed resin to exhibit both a higher density and a greater firmness (i.e., within the parameters noted above), although the presence of only one of these mechanical characteristics may be present if the mat has sufficient mechanical strength to bear the load of biomass and/or added liquid in the specific application into which is it placed.

The mechanical characteristics of density and/or ILD may be uniform throughout the foamed resin of the mat, or the resin may be formulated or assembled such that the mechanical characteristic(s) vary from area to area of the mat. For example, if the mat is in the form of a substantially rectangular prism, it may be desirable that the mechanical characteristic(s) of the foamed resin is present as a decreasing or increasing gradient along the X-axis of the prism, i.e., a hypothetical geometric axis initiating at a point on the first surface and terminating at a point on the second surface. (For purposes of clarity, it is noted that this geometric axis is an axis of the mat itself and is therefore different that the winding axis described above). As an example, the ILD of the foamed resin may be about 100 lbs. at the first surface, then decreases along the geometric X axis and may be about 25 lbs. at the second surface, or the pore size of the foamed resin may be about 4 to about 8 ppi at the first surface, the decreases along the geometric X axis to be about 25 to about 35 ppi at the second surface. Alternatively, the mat may include two or more discrete layers of foamed resins, each of which exhibits a different magnitude of the selected mechanical characteristic. In such configuration, it is preferred that the layer or portion of the mat that forms the exteriormost (or the interiormost) region of the cylindrical format is the layer or portion having the greater ILD and/or density.

The foamed resins may exhibit other mechanical or chemical properties. The nominal pore size of the foamed resin may vary; it may be dictated by the specific end application or desired use. In an embodiment, foamed resin has a nominal pore size of about 5 pores per liner inch (ppi) to about 70 ppi, about 7 to about 35 ppi or about 10 to about 25 ppi.

Nominal distribution of pores within foamed resin may also be varied. However, it may be preferred that pore distribution is about 5 to about 70, alternatively, about 10 to about 40.

The foamed resin of the mat may be prepared of a neat resin. Alternatively, it may be desirable to include various additives in the resin to improve or modify performance, durability, water sheddability, handling and other properties. For example, it may be desirable to include clays, UV absorbers or protectants, antimycotic agents, antibacterial components (for example, if selective for specific types of undesirable bacteria), colorants, deodorizers, fragrances, crafted polyols and combinations thereof.

The invention also includes a device for the filtration of a liquid or gas material. The device may include one or more reactor modules. The reactor modules include a filtration medium (as described herein). In an embodiment, the reactor module includes at least one chamber. It may be any configuration, such as square, polygonal or rectangle or circular in cross-section.

A given device of the invention may include one or more reactor modules that contain the filtration media discussed above and, optionally, a lid or cover. Within a device, each reactor module may be identical (that is same type and structure of foam and/or biomass). Alternatively, each reactor module may be targeted to remove or oxidize a particular contaminant and therefore necessarily contain a structurally different mat and/or contain a mat that has been inoculated with a specific type of microorganism that is know to reduce the targeted contaminant. The devices may also include other features that aid in the efficiency of the process, such as baffles to facilitate the even distribution of gas or liquid through the device; spray nozzles situated to permit moistening of the media and/or delivery of other substances to the media; and/or collection or elimination systems.

Referencing FIGS. 1A, 1B, 2 and 3, the invention also includes a device (23) for the filtration of a liquid and/or a gas material. The device (23) may include one or more reactor modules (13) and a lid (39). In an embodiment, the reactor module (13) includes the filtration medium (11), in any variation as described above, and a chamber (1). The chamber (1) may be substantially cylindrical (i.e., of a substantially circular cross section when viewed in the Y-Z plane). The chamber includes one or more sides (7), a top (5) and a bottom (3). The chamber (1) includes a base (9) that extends radially from the interior side(s) (7) of the chamber (1) towards the center of the chamber (1). The base (9) may be made of any suitable material, including metal, polymer, fiberglass reinforced polymers (such as polyesters, nylons, isopolyesters, polyethylenes, isophthalic resins, orthothalic resins, vinyl esters, epoxies, phenolic resins, and polypropylenes) and/or textile and may be a size corresponding substantially to the diameter of the chamber (3) or it may be a fraction of the size, e.g., it may be "donut type" configuration, a base with cut outs, a series of prong or bars and the like. The reactor chamber (3) and/or the lid (39) may also include one or more ports (15, 19, 21) for conveying the liquid or gas material in and out of the reactor module. Depending on the phase of the material to be filtered (gas or liquid) the ports will serve different purposes. If a gaseous material is filtered, the inlet port(s) may be located beneath the filtration medium at the base of the chamber and the outlet port(s) may be located above at least a portion of the filtration medium in the upper portion(s) of the chamber or the lid. The converse arrangement may be utilized if a liquid material, such as wastewater, is filtered.

In some embodiments, the modules may contain one or more mediums (for example, layer within a chamber). Such media ay be the same or may be different. For example, at least one medium may be a medium of the invention and the other(s) may be of another type of medium, such as, for example, charcoal, carbon, wood chips, compost, fiberglass, paper, silica, and/or clay. Similarly, the device may include one or more modules, each modules having a different medium or set of media.

Figure 1A:
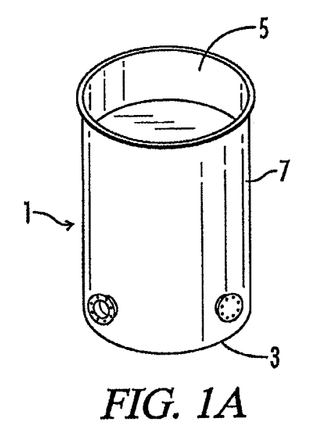
FIG. 1A shows a perspective view of an exemplary chamber into which the filtration medium may be disposed to form a reactor module.
Figure 1B:
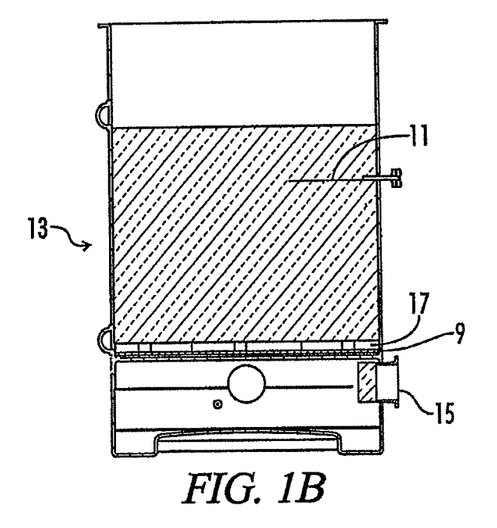
FIG. 1B shows a cutaway longitudinal cross-section (section B1-B1) of an exemplary reactor module.
Figure 1C:
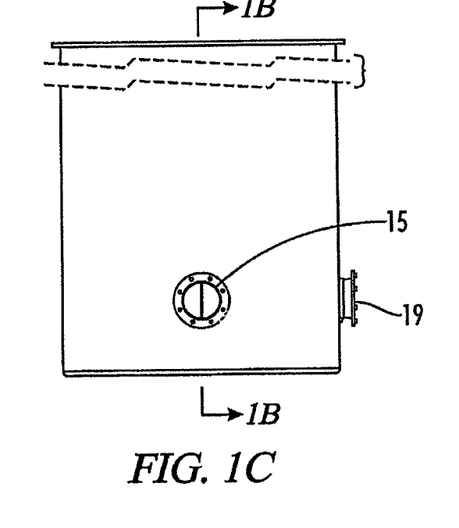
FIG. 1C shows the exemplary chamber of FIG. 1A showing the location where the cross section B1-B1 was taken and which is shown in FIG. 1B.
Figure 2:
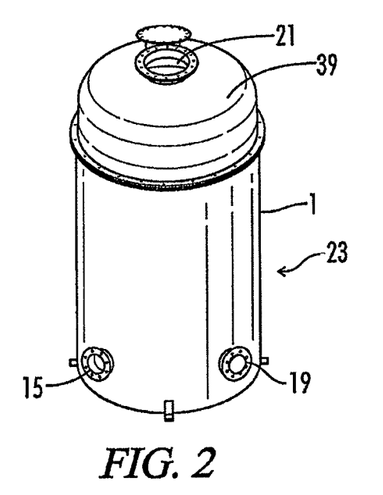
FIG. 2 shows a perspective view of an exemplary device that includes a lid and reactor module.
Figure 3:
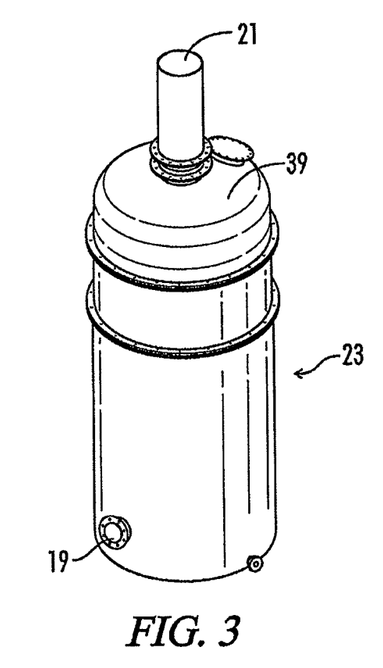
FIG. 3 shows a perspective view of a different exemplary device that includes a lid and a reactor module.

In an embodiment, the base (9) is in the form of a grate, support beams, posts, wire shelf or combinations of these. The selected filtration medium (11) is disposed within the chamber (3) such that the winding axis (29) of the mat (35) is substantially parallel to the sides of the chamber (3) and the filtration medium rests within the chamber (3) on the base (9). Optionally, a spacer may be placed between the base (9) and the filtration medium (11), and/or between any adjacently stacked mediums. Such spacer may be adapted to promote even distribution of the material undergoing filtration through the medium and/or to create turbulence in the material.

Also included within the scope of the invention are methods of filtering a gas or liquid material. Such methods include applying a gas or liquid material to the filtration medium described above, preferably when such medium is disposed within the device described above.

For example, if material to be filtered is a gas, foul air enters the bottom of the chamber (1) through port (15) after which it is equalized in the bottom portion of chamber (1) before it flows at substantially equal upflow velocity through the cross section of the filtration medium (11). While the air flows through the filtration medium (11), the odorous and other compounds in the air are transferred to the microorganisms that oxidize the compounds to non-odorous compounds. The filtration media may be separated to include an equalization layer between the filtration media. While the air is flowing through the filtration medium (11), potable or substantially clean wastewater effluent is sprayed on top of the filtration medium (11) at uniform flow distribution. The water is used to remove the microbial products of oxidation, dead microorganisms, enhance mass transfer of compounds from air to water and microorganisms, and keep the microorganisms moist to allow for optimum growth. The water flow may be intermittent or continuous. The chamber (1) is fitted with a roof (39) and the filtered air exits the roof (39) through port (21).

Figure 6:
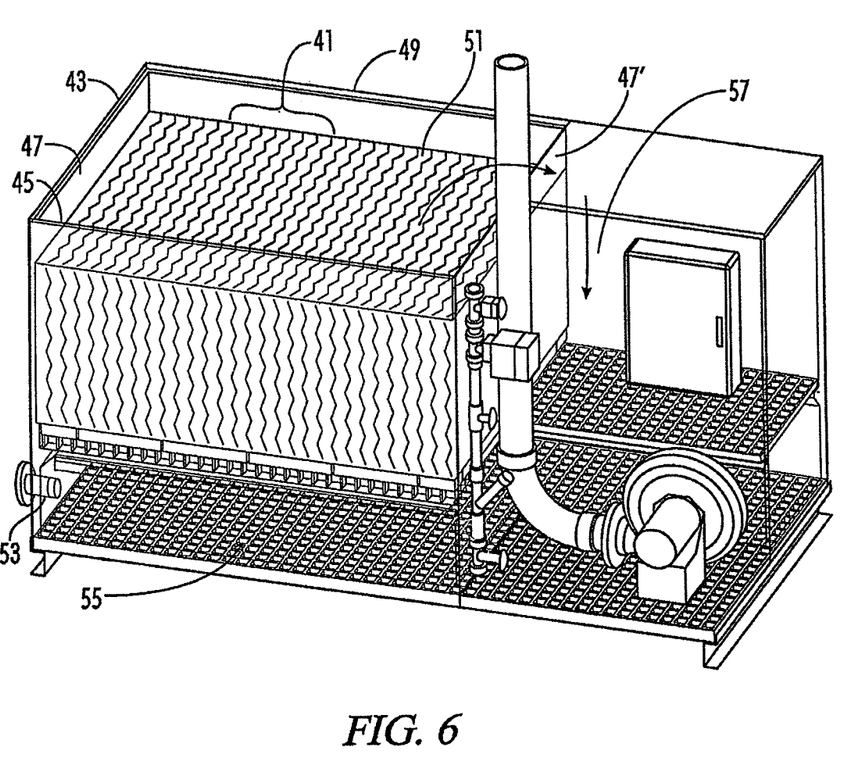
FIG. 6 is a perspective cut-away view of a device including a reactor module that has the filter media arranged in a vertical stacked configuration.

Referencing FIG. 6, an embodiment is shown having at least two mats arranged in a vertical stack (41) and disposed within a rectangular chamber (43) having four walls (45, 47, 47', 49) and a base (not visible). In some embodiments, the chamber (43) may include multiple vertical stacks (41) that are separated by a spacer between them. FIG. 6 shows an embodiment wherein the base has a structure that supports the vertical stack (41) but permits the filtrate (gas) to pass through. For example, the base may be a grid structure. The module of FIG. 6 includes a gas inlet (53) through which gas is passed into a plenum chamber (55), after which it passed through the vertical stack. In the specific device of FIG. 6, the gas subsequently passes through an additional reactor module (57) that contains a filtration medium consisting of common activated charcoal.

The individual mats in the vertical stack of FIG. 6 each bear a peak-and-valley convolution having a peak-to-valley dimension of about 0.25 inches to about 0.75 inches. The side walls 47 and 47' of the chamber apply a compressive force of about 3 lb/ft to about 5 lb/ft on the vertical stack.

Figure 7A:
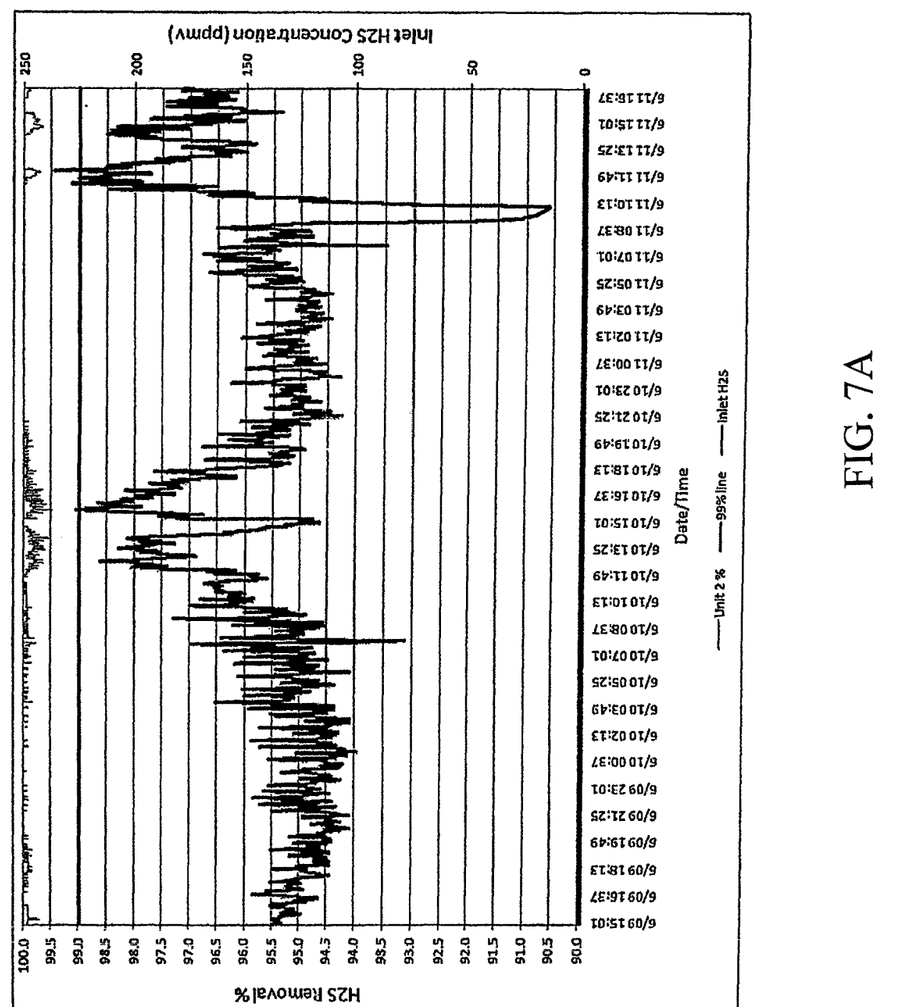
Figure 7B:
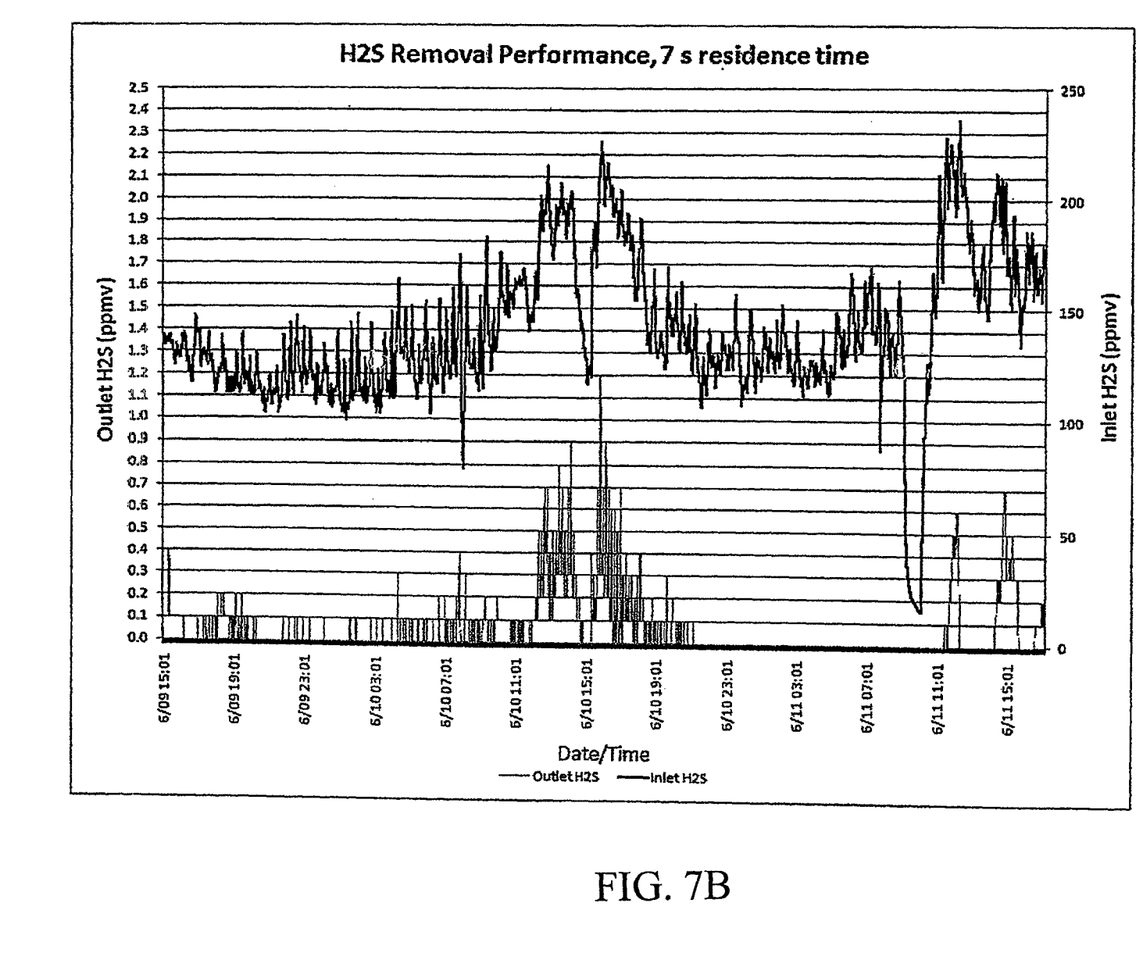
Figure 8:
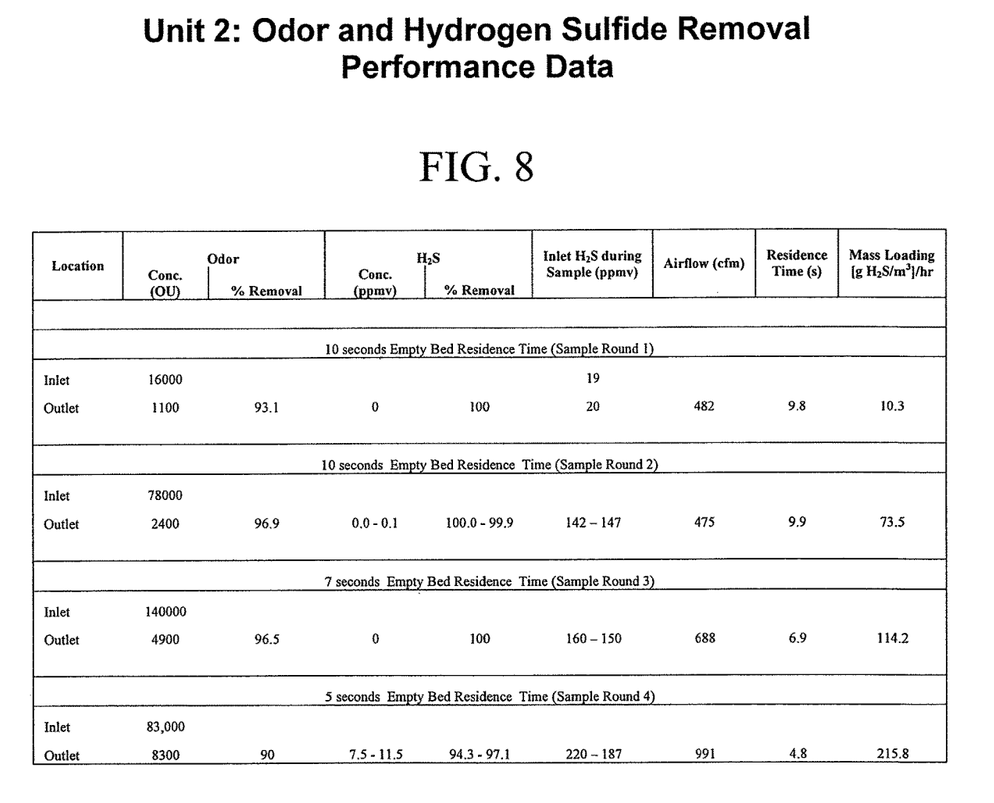
FIG. 8 is a chart showing odor removal as compared to residence time of a gas filtering device of the invention.

Referencing FIGS. 7 (7A and 7B) and 6, data is provided showing the efficiency and dpr removal capabilities of the invention. In FIGS. 7A and B, the data shown is a result of air that was blown through the reactor at 675 cfm (cubic feet per minute), which resulted in an empty bed residence time of 7 s. The hydrogen sulfide ($H_2S$) concentration of the air entering the reactor device and that of the air exiting the reactor through the exhaust stack are measured with Oda-Logs every 10 s. FIGS. 7A and B shows the inlet and outlet $H_2S$ concentration vs. time, as well as the removal efficiency vs. time for the same data at 7 s empty bed residence time.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. A method for reducing the concentration of hydrogen sulfide ($H_2S$) in a gas stream comprising the steps of:
    winding a polyurethane mat into a coiled cylinder (33) at a winding tension of about 1 lbs/ft to about 40 lbs/ft, the polyurethane mat having a first planar surface and a second surface having an array of uniform protrusions extending therefrom, the polyurethane mat having a density of about 1 lbs/ft$^3$ to about 3 lbs/ft$^3$ and an indentation load deflection of about 35 lbs to about 150 lbs, the tops of the protrusions of the array of uniform protrusions contacting the first planar surface in the coiled cylinder and defining turbulence generating tortuous flowpaths along the length within the coiled cylinder;
    inoculating the polyurethane mat with a biomass that is capable of breaking down or oxidizing hydrogen sulfide ($H_2S$) into non-odorous compounds;
    placing the coiled cylinder into a reaction chamber (3) of a cylindrical reactor module (13) having an inlet port (15) in the lower end of the cylindrical reactor module (13)
    introducing a gas stream containing hydrogen sulfide ($H_2S$) into the inlet port (15) at a flow rate resulting in an empty bed residence time (EBRT) of approximately seven seconds;
    flowing the gas stream into a lower end of the coiled cylinder, through the tortuous flowpaths and into contact with the biomass for a period of time sufficient to breakdown or oxidize the hydrogen sulfide ($H_2S$) present into non-odorous compounds;
    spraying water atop the coiled cylinder; and
    flowing the gas stream which has passed through the tortuous flowpaths out of an outlet (21) at an upper end of the cylindrical reactor module (13), the gas stream exiting the cylindrical reactor module (13) having a significantly reduced hydrogen sulfide ($H_2S$) concentration as compared to an inlet concentration of sulfide ($H_2S$).

2. The method for reducing the concentration of hydrogen sulfide ($H_2S$) in a gas stream of claim 1, wherein the winding tension is about 2 lbs/ft to about 20 lbs/ft.

3. The method for reducing the concentration of hydrogen sulfide ($H_2S$) in a gas stream of claim 1, wherein the winding tension is about 4 lbs/ft.

4. The method for reducing the concentration of hydrogen sulfide ($H_2S$) in a gas stream of claim 1, wherein the density is about 1.2 lbs/ft$^3$ to about 2.5 lbs/ft$^3$.

5. The method for reducing the concentration of hydrogen sulfide ($H_2S$) in a gas stream of claim 1, wherein the density is about 1.8 lbs/ft$^3$.

6. The method for reducing the concentration of hydrogen sulfide ($H_2S$) in a gas stream of claim 1, wherein the indentation load deflection is about 75 lbs to about 120 lbs.

7. The method for reducing the concentration of hydrogen sulfide ($H_2S$) in a gas stream of claim 1, wherein the indentation load deflection is about 85 lbs to about 105 lbs.

8. The method for reducing the concentration of hydrogen sulfide ($H_2S$) in a gas stream of claim 1, wherein a shape of the protrusions is selected from: an egg crate profile or a sine wave profile or a rectangular profile or a zig-zag rectangular profile or a chevron profile or a projecting villi profile or a compound villi or a tractor wheel profile or a V-shaped profile.

9. The method for reducing the concentration of hydrogen sulfide ($H_2S$) in a gas stream of claim 1, wherein the biomass includes a bacteria and/or a fungi.

10. The method for reducing the concentration of hydrogen sulfide ($H_2S$) in a gas stream of claim 1, wherein the water spraying is intermittent.

11. The method for reducing the concentration of hydrogen sulfide ($H_2S$) in a gas stream of claim 1, wherein the water spraying is continuous.

12. The method for reducing the concentration of hydrogen sulfide ($H_2S$) in a gas stream of claim 1, wherein the water being sprayed is wastewater.

* * * * *